H. B. SWARTZ.
VOTING MACHINE.
APPLICATION FILED JULY 29, 1907.

935,869.

Patented Oct. 5, 1909.
10 SHEETS—SHEET 1.

Witnesses:
W. O. Beebe
E. Swartz

Inventor,
Hiram B. Swartz

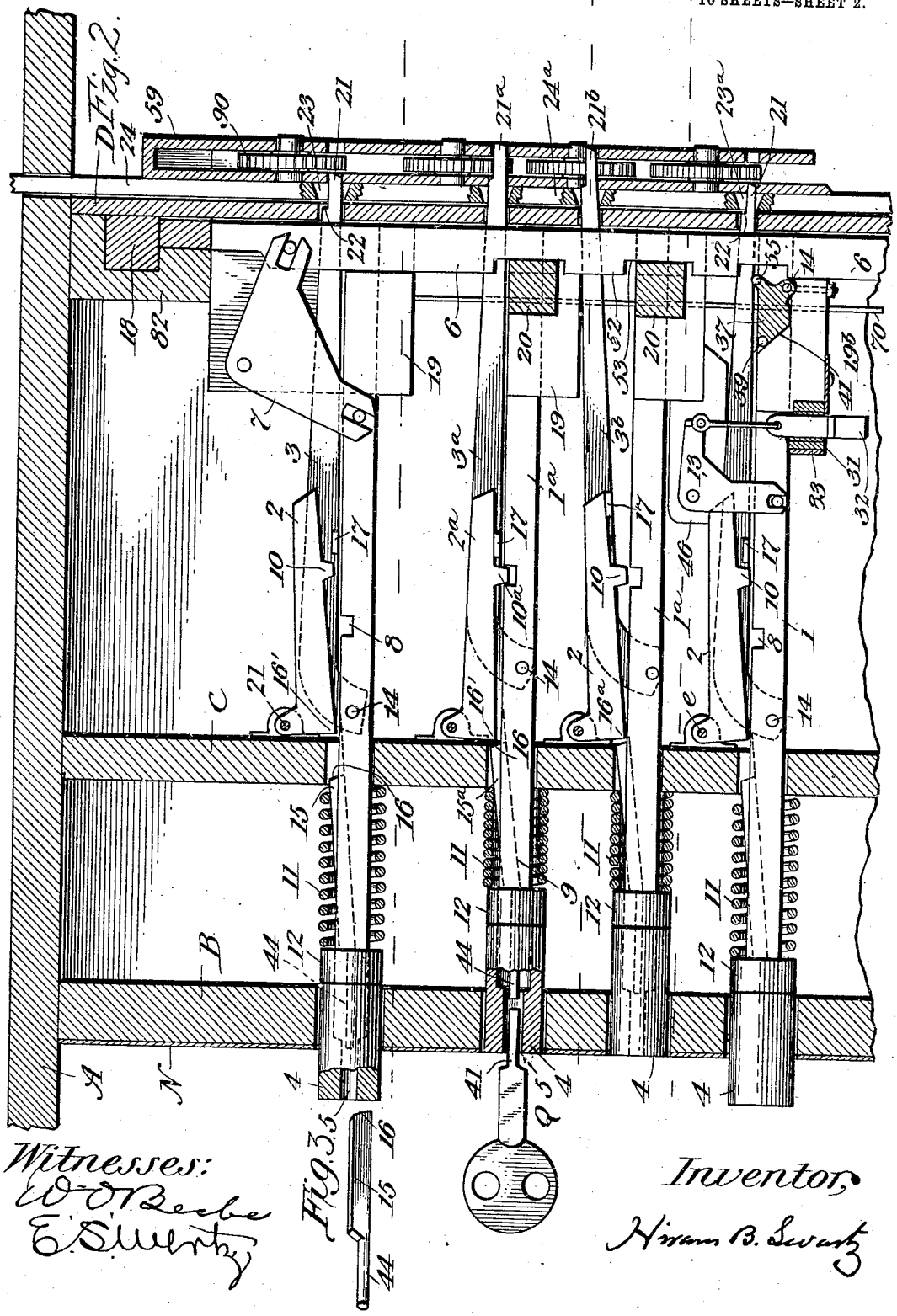

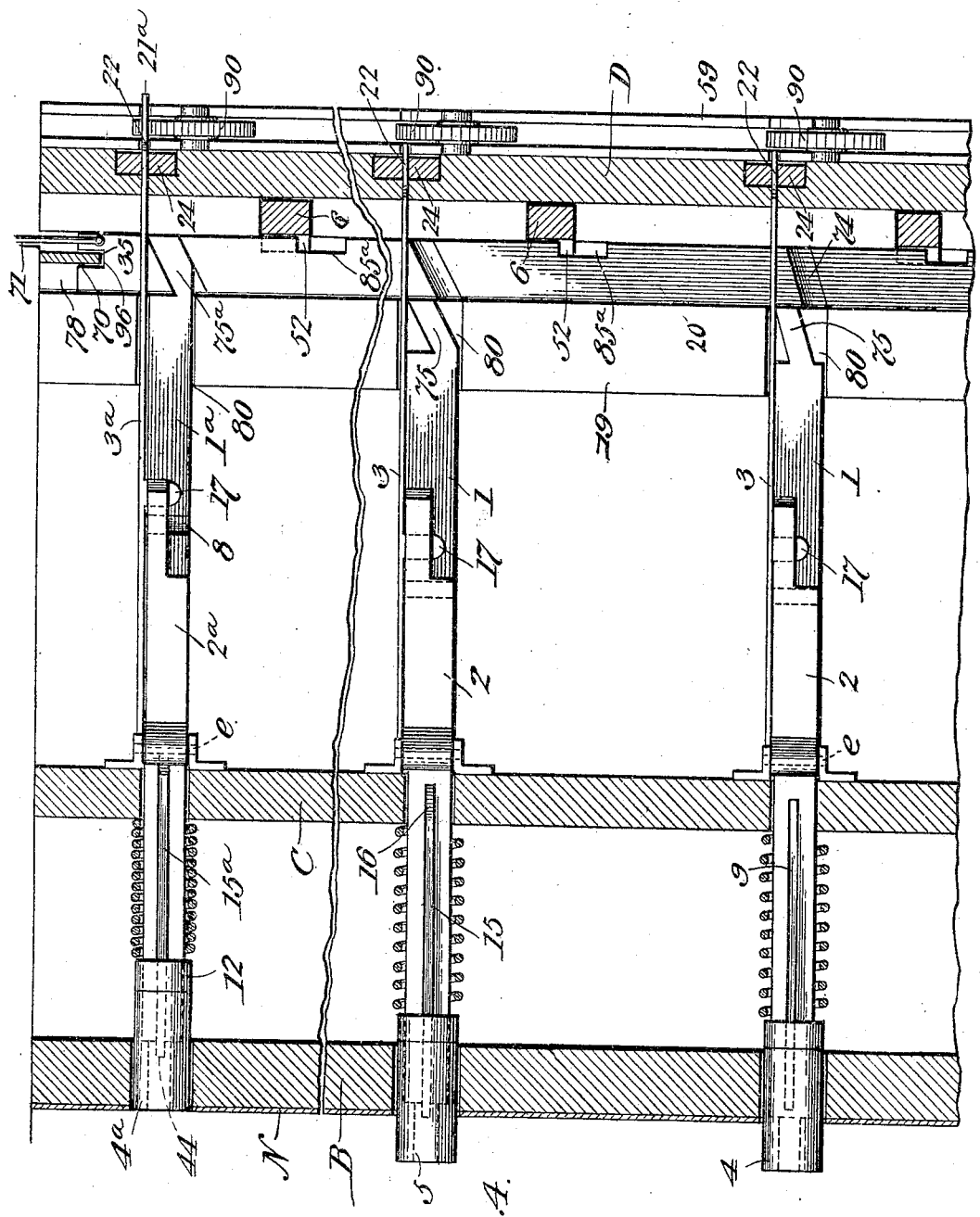

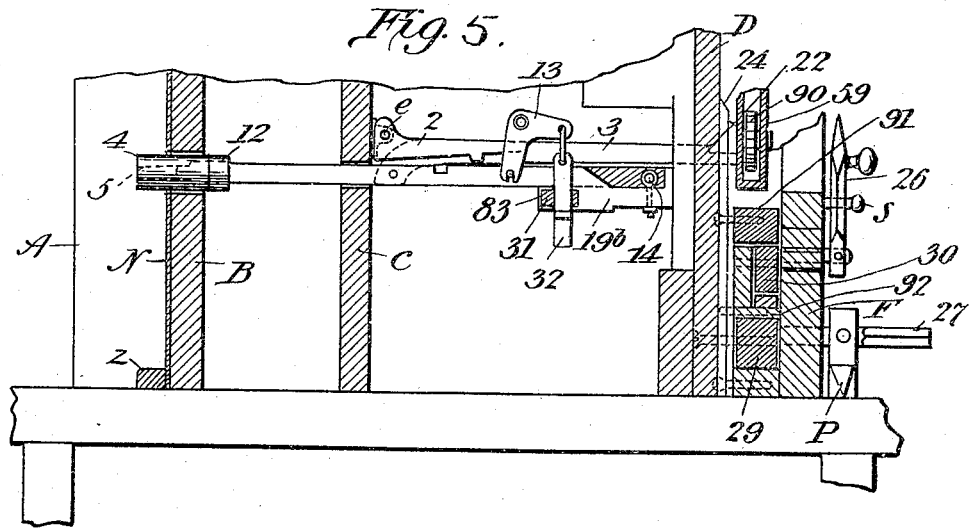
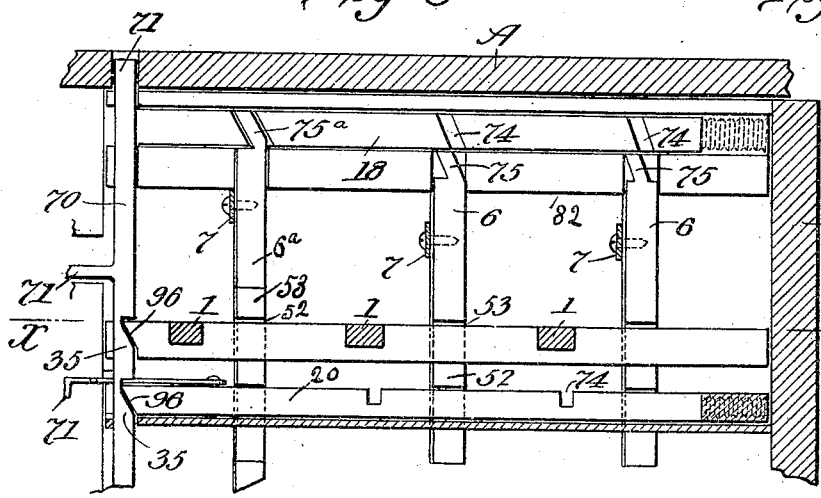
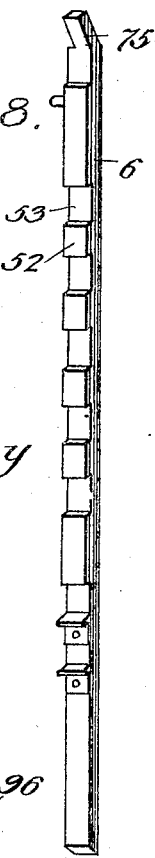

H. B. SWARTZ.
VOTING MACHINE.
APPLICATION FILED JULY 29, 1907.

935,869.

Patented Oct. 5, 1909.
10 SHEETS—SHEET 5.

Witnesses:

Inventor,
Hiram B. Swartz

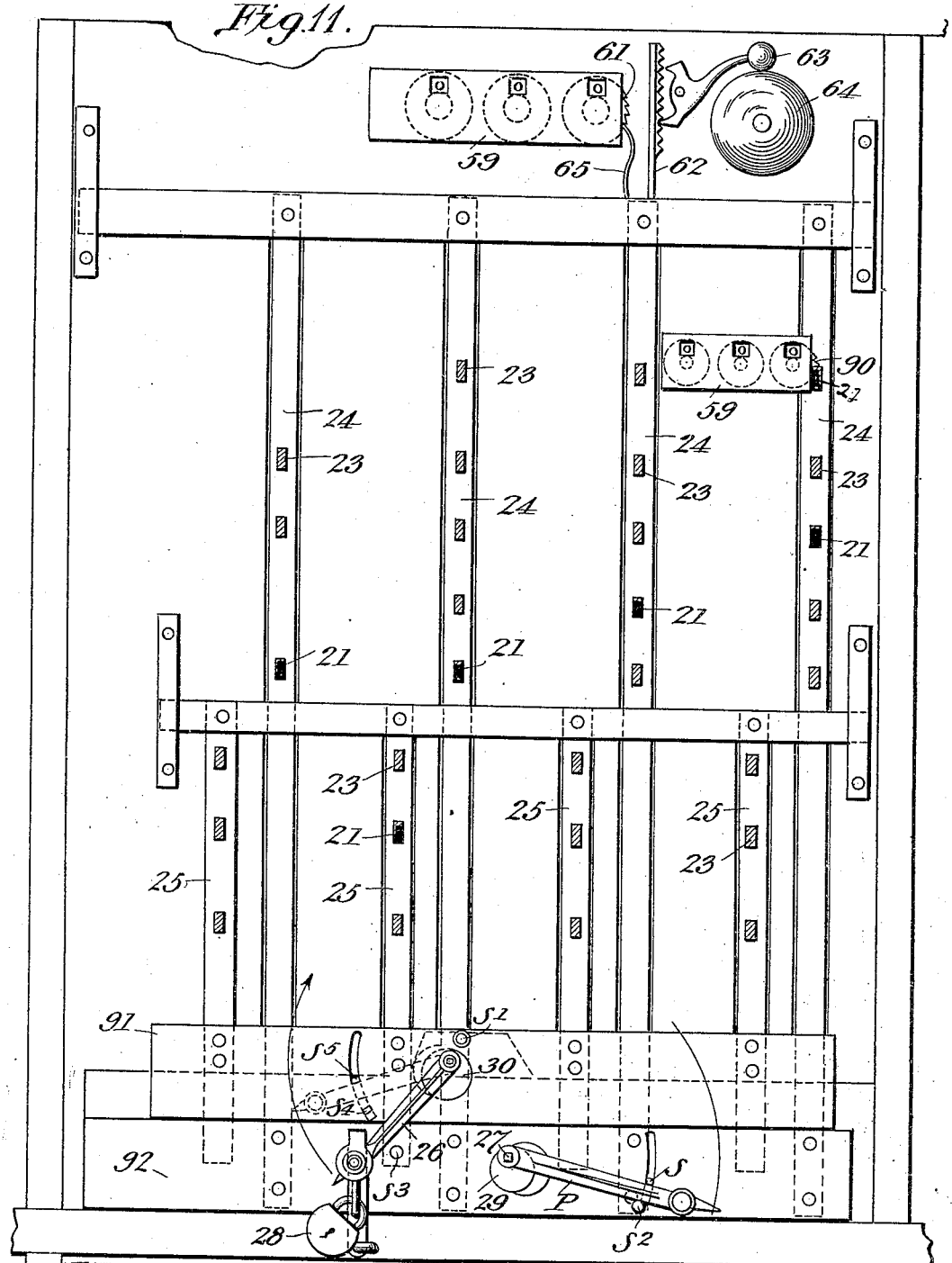

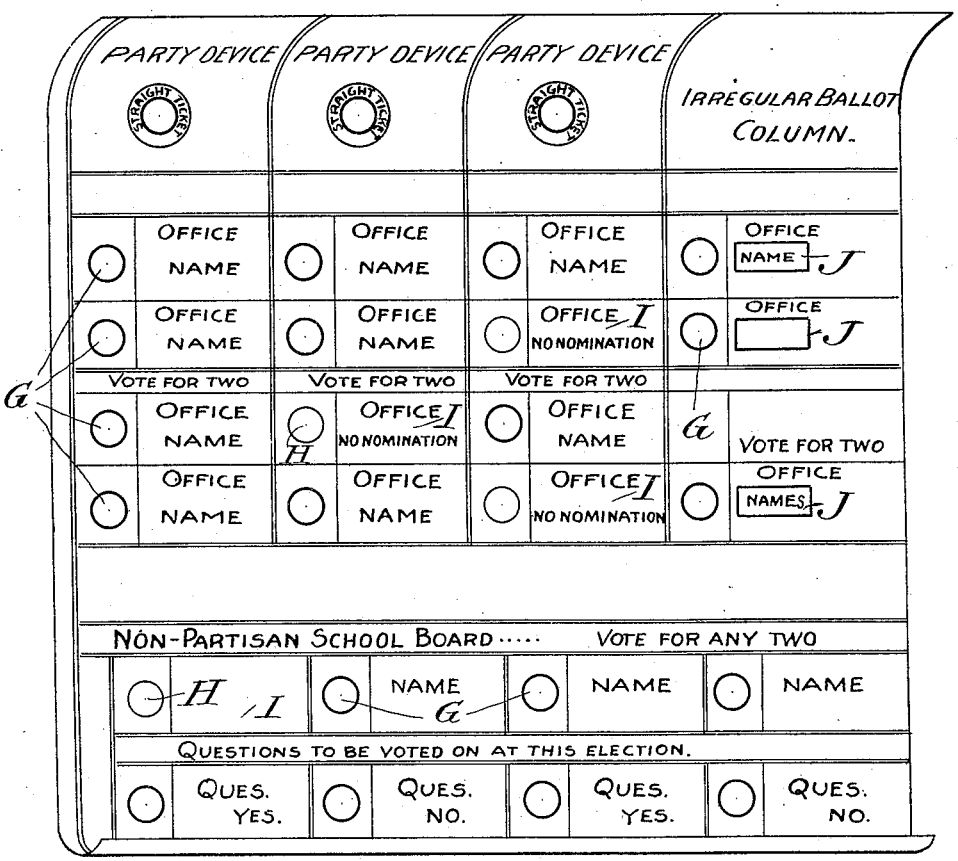

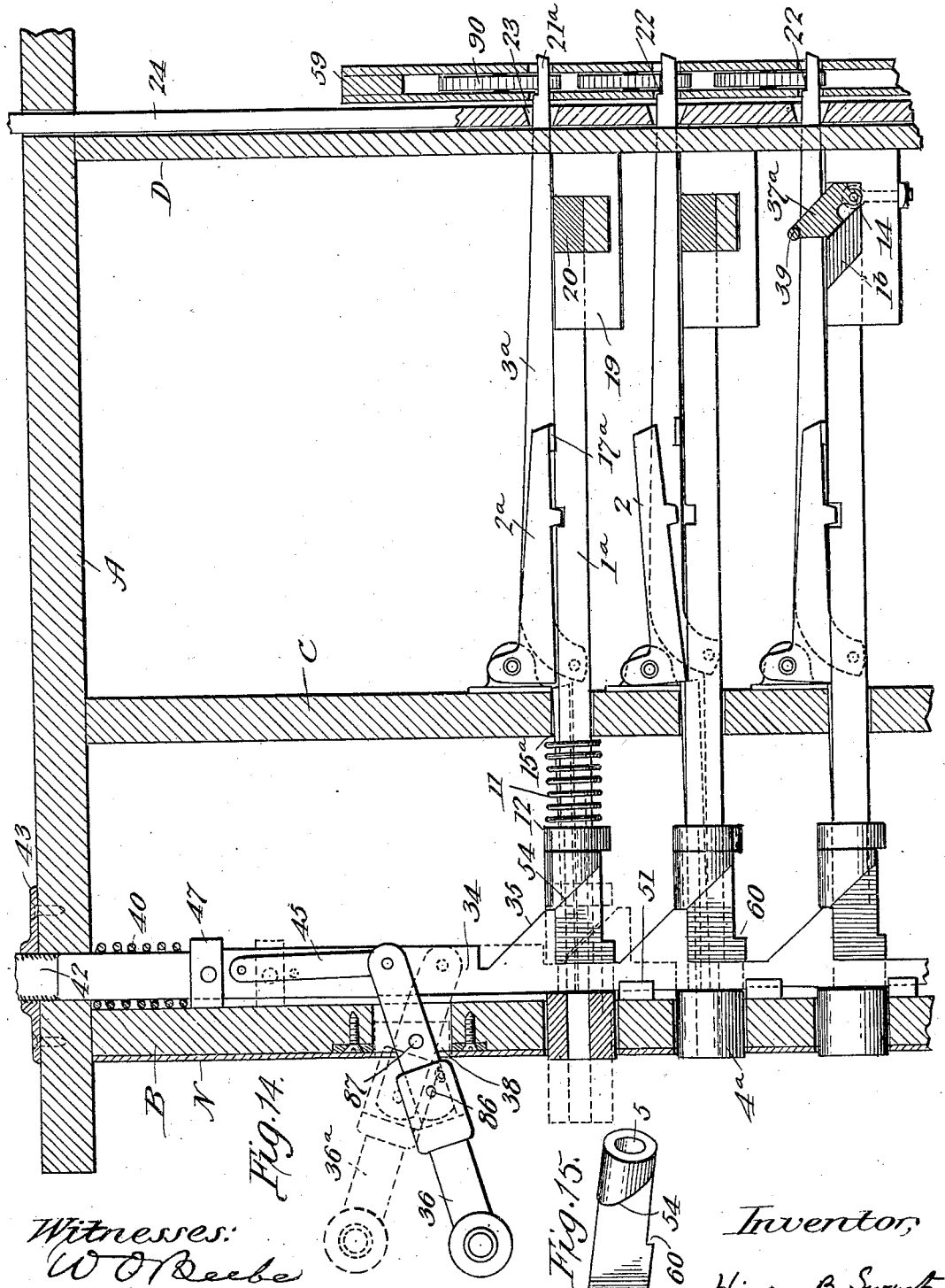

H. B. SWARTZ.
VOTING MACHINE.
APPLICATION FILED JULY 29, 1907.

935,869.

Patented Oct. 5, 1909.
10 SHEETS—SHEET 9.

Witnesses:

Inventor,
Hiram B. Swartz

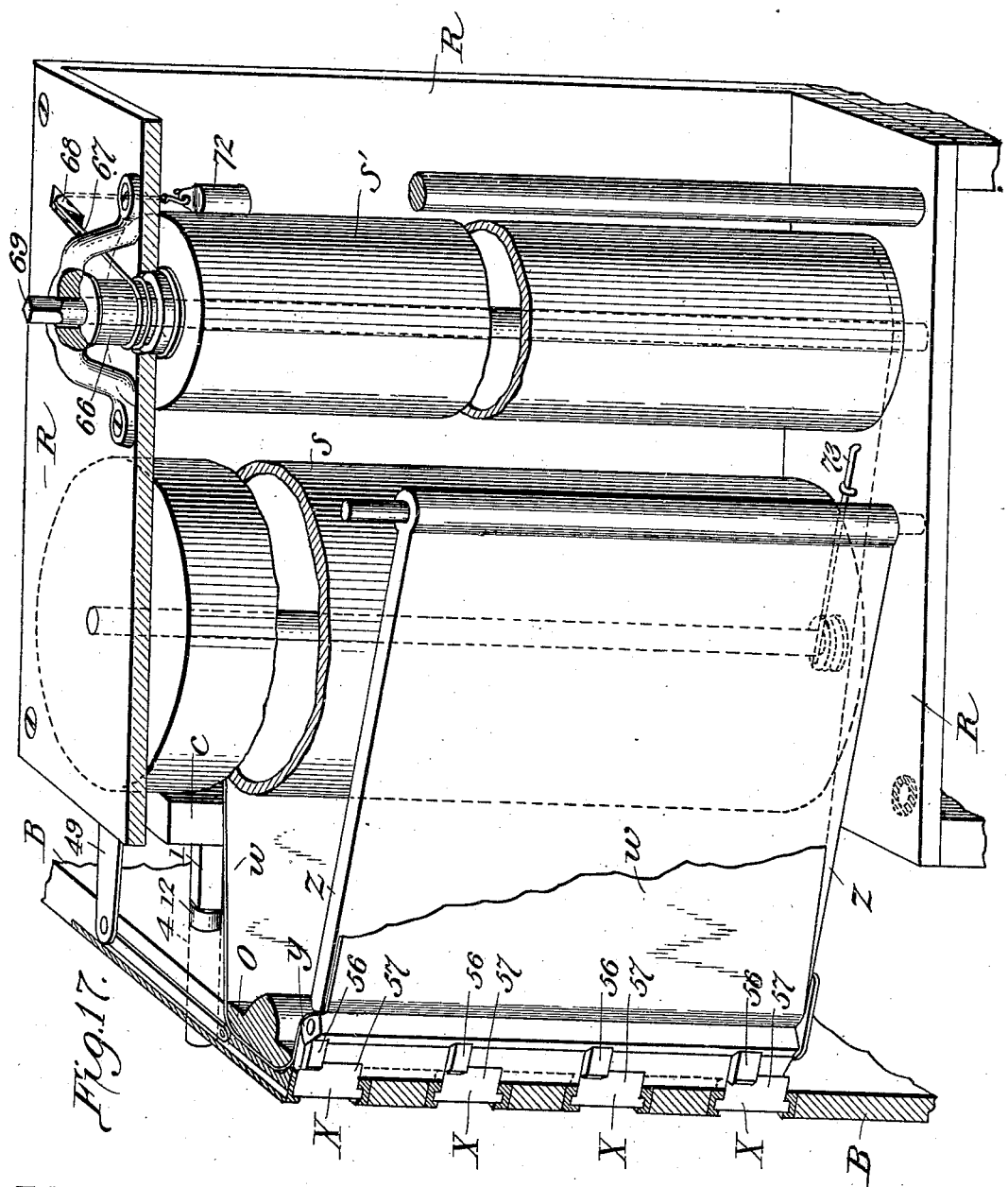

UNITED STATES PATENT OFFICE.

HIRAM B. SWARTZ, OF WOOSTER, OHIO.

VOTING-MACHINE 935,869.  Specification of Letters Patent.  Patented Oct. 5, 1909.

Application filed July 29, 1907. Serial No. 386,147.

*To all whom it may concern:*

Be it known that I, HIRAM B. SWARTZ, a citizen of the United States, residing at Wooster, in the county of Wayne and State of Ohio, have invented a new and useful Voting-Machine, of which the following is a specification.

My invention relates to voting machines. Its object is to provide a voting machine of durable, compact and inexpensive construction, and especially adapted to afford mechanically all the advantages of the well known Australian ballot, but with greater promptness, precision and safety; to register secretly and accurately the votes as cast, keep open tally of the total vote, and enable the voter by a single and speedy manipulation to vote in absolute secrecy either a straight, mixed, cumulative or irregular ballot according to his choice, and permitting him to change his vote at pleasure while at the machine; to afford means for readily placing an official ballot sheet upon the face of the machine, and setting the mechanism suitably to an election with no extra appliances in sight to confuse the voter, and to prevent fraudulent tampering with the registers, repeating, or improper voting upon either questions or candidates.

With these and other incidental objects in view as hereafter stated, my invention consists of the various novel features of construction and operation hereinafter described and claimed, including such modifications as are fairly within the scope of the invention as set forth.

My invention is illustrated by the accompanying drawings in which—

Figure 1:
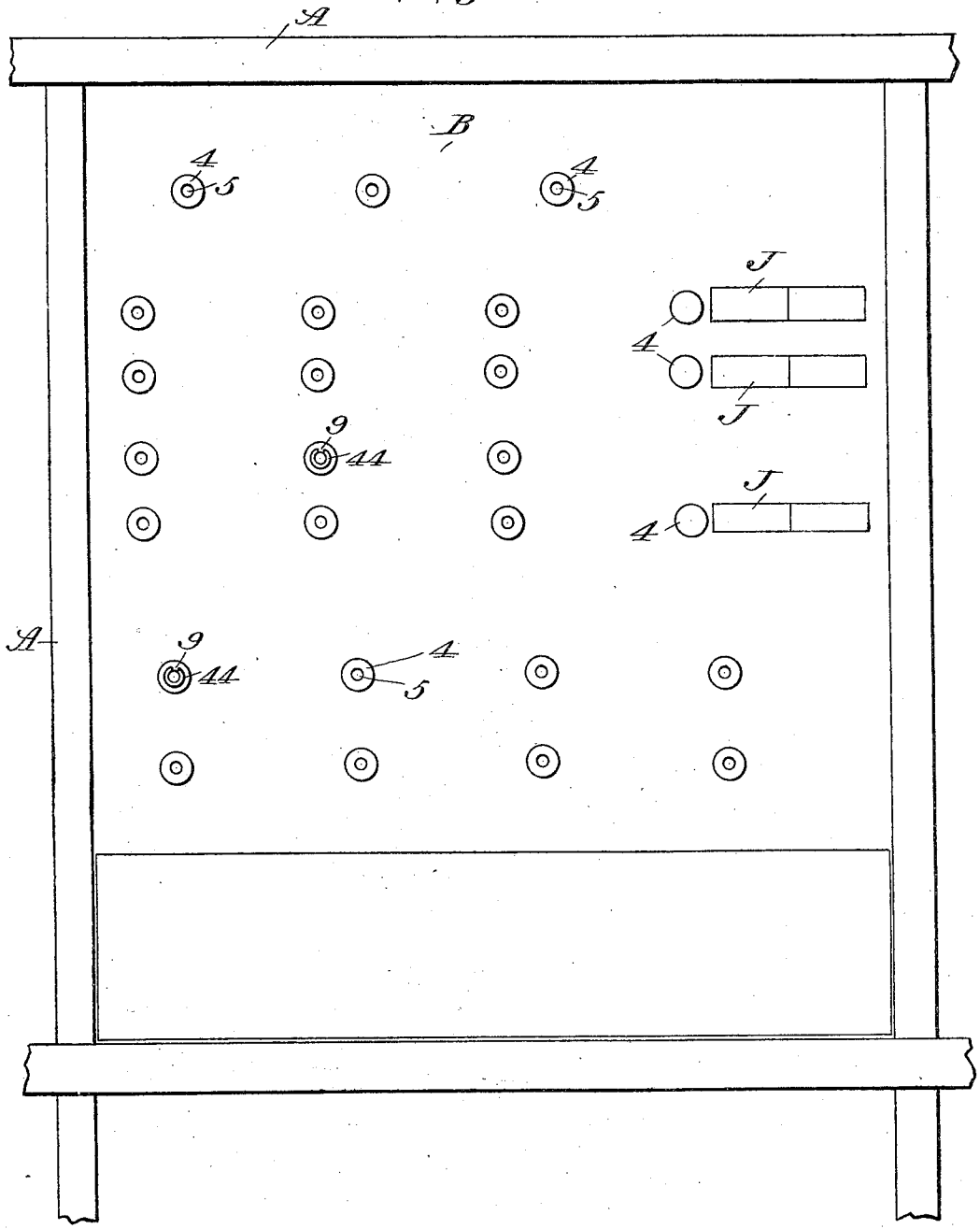
Figure 9:
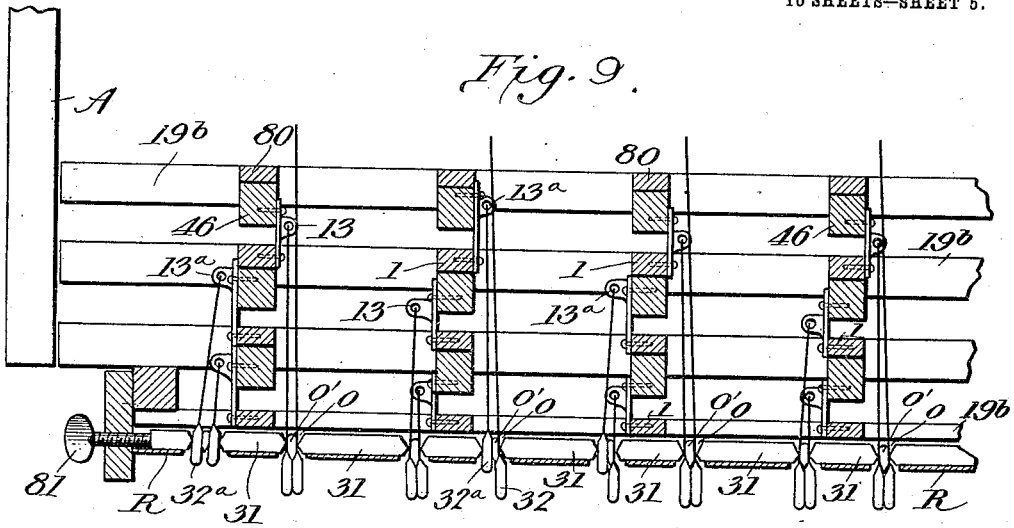
Figure 10:
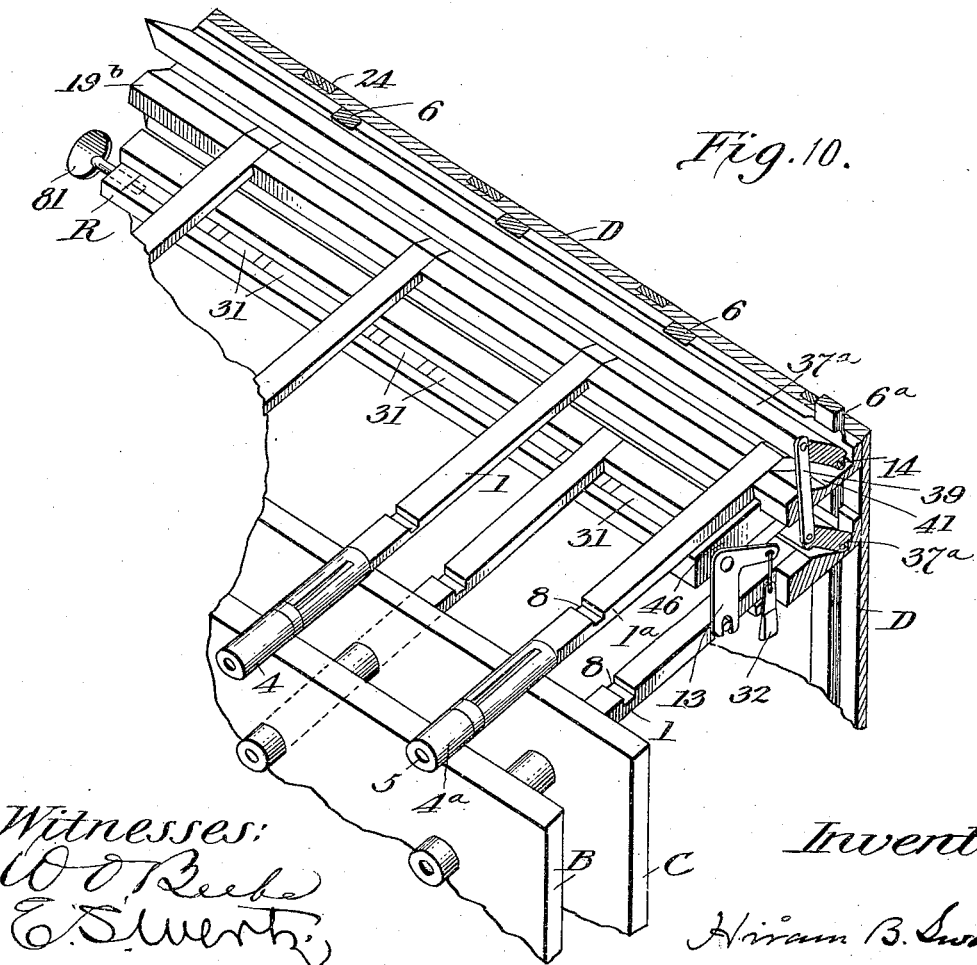
Figure 16:
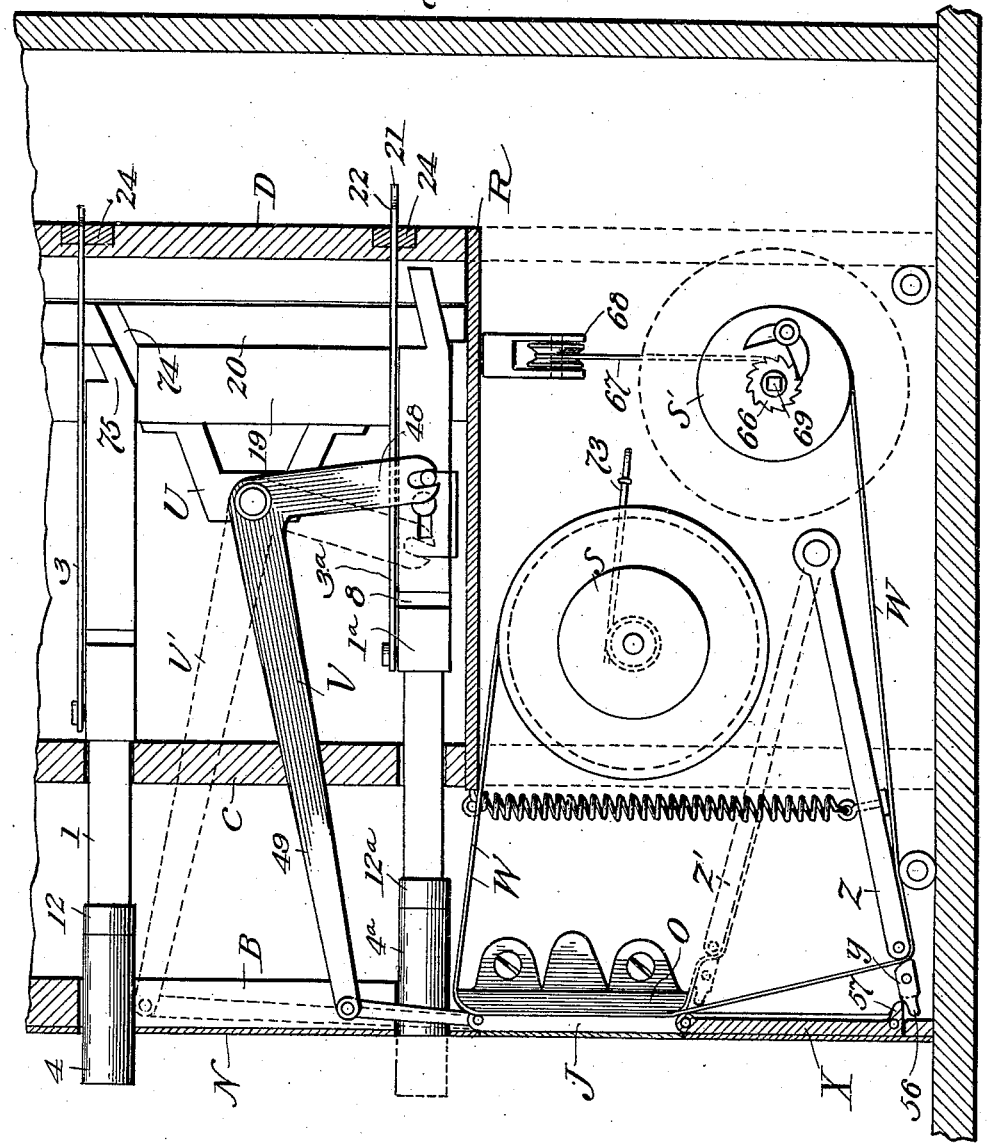

Figure 1 is a plan view of the face of the machine showing parts of several vertical party columns and horizontal office rows of voting keys sufficient for illustration—the parts not shown being substantially identical with those illustrated. Fig. 2 is a vertical sectional view of one side of so much of the operating mechanism as is necessary for illustration. Fig. 3 illustrates a key for actuating a trigger more particularly described hereafter. Fig. 4 is a top view of my single candidate voting mechanism on line *x—y* of Fig. 6. Fig. 5 is a vertical cross section of the operating gear I use to actuate the register bars and their connections. Fig. 6 is a vertical longitudinal section of a straight ticket voting and interlocking device and connections. Fig. 7 is a detail view of one of my single candidate slide bars. Fig. 8 is a detail view of one of my straight ticket slide bars. Fig. 9 is a vertical longitudinal section of my group voting device and connections. Fig. 10 is a perspective view of the same. Fig. 11 is an elevation of the rear face of my machine with counters removed, showing my register bars and locking means for limiting voters. Fig. 12 is a detail view of my means for actuating the register bars at a distance from the machine. Fig. 13 is a perspective detail view of my device for interlocking my group voting and irregular voting mechanism. Fig. 14 is a vertical longitudinal section showing a modification of my straight ticket voting device and connections. Fig. 15 is a detail perspective view of a detachable push-knob for my machine. Fig. 16 is a top view of my irregular voting mechanism and its connections. Fig. 17 is a vertical longitudinal view of the same in perspective. Fig. 18 is a plan view of my detachable ballot sheet.

For secrecy in voting I provide a booth—not shown in the drawings—constructed of any suitable material, and adapted to cover the front of the machine and surround the voter in the usual and well known manner in the use of the Australian ballot. I also provide suitable doors—not shown in the drawings—for the front and rear faces of the machine which may be mounted and locked in any suitable manner to secure the interior mechanism. As no claim is made to these attachments, further description of the same is omitted.

Referring now to the drawings, A is the outer case or housing of my machine.

B is the front wall of the machine case. It is provided with perforations 4 sufficient to accommodate as many voting keys as may be required, these being permanently arranged in vertical and horizontal rows as hereafter stated.

C is a central partition which supports the outer ends of the several voting keys 1 and dogs 2, hereafter described, and constitutes a seat for the springs 11 which serve to return the voting keys from advanced to initial positions, as hereafter explained.

D is the rear wall of the machine which supports the counters 23 and the adjacent and connected mechanism.

F is the lower part of the rear casing through which the shanks of the operating lever shafts extend as shown in Fig. 5.

The foregoing constitute the framework of the machine and may be made of any suitable material or in any manner suited to the purpose.

The several voting keys used are surmounted with detachable push-knobs (Fig. 15.) which extend through the casing B in the perforations aforesaid, and are preferably arranged in several vertical party columns and horizontal candidate or office rows (Fig. 1.) in the manner commonly employed upon an Australian ballot—that is to say—the straight ticket voting keys are arranged in a horizontal row at the top under their appropriate party emblems as shown in Fig. 18 and the candidate voting keys are arranged in vertical party columns and horizontal office or candidate rows; but this arrangement is subject to modification as desired. A separate column of voting keys corresponding to the several office rows or groups is also arranged at one side of the machine face for the purpose of irregular voting, and as many party columns are provided for as may be necessary, and are arranged in the order required by the election laws. Non-partisan rows of voting keys may also be arranged either at the top or bottom on either end of the machine face, preferably somewhat out of line with the several party columns as shown in Fig. 1. The several counters for each office row are mounted in a support 59 secured to the rear face of the machine so as to afford one counter for each voting key, and their several units-wheels are set out of direct range with their companion voting keys as shown in Fig. 2. The manner of constructing my counters is reserved for a separate application, and my present claims with respect thereto relate to the location of the units-wheel and the novel means I use for reaching and actuating the same.

As no two elections are alike in all respects—parties, candidates and questions to be voted upon often varying greatly—it is important that means should be provided whereby nothing should appear on the face of the machine but the indicia or ballot of the particular election. To accomplish this I provide a single detachable ballot sheet (Fig. 18.) adapted to be spread upon the face of the machine. This ballot sheet is perforated to exactly register with the perforations in the face of the machine (Fig. 1) and the columns, office rows, candidates and party emblems printed thereon are so arranged that the perforations of the ballot are exactly suited thereto and in position to accommodate the several push-knobs that may be required for the given election and no more. It is thus prepared in advance of the election and adapted to be secured upon the face of the machine by cleats $z$ or any other suitable fastenings, and may thus be readily detached when the election is over and preserved for reference. For this purpose also I provide detachable push-knobs (Fig. 15) for the several voting keys 1, adapted to enter the perforations aforesaid, and to be secured to the voting keys back of the casing B by any suitable fastenings. In Fig. 18, G indicates the ballot perforations and their location, and H the several blanks thereon where there is no nominations. By the means aforesaid the election officers can readily adjust the ballot sheet and the push-knobs, and if necessary, make additional perforations and add names of candidates and apply other push-knobs to meet any emergency, and a ballot sheet is provided with all unused appliances out of sight of the voter, thus preventing his confusion.

Referring now to the voting and vote registering mechanism, 1 is a voting key, in general such as I use throughout the machine.

R is the push-knob and 11 a spring for returning the key from advanced to its initial position, and 8 is a notch for a purpose hereafter stated.

3 is an extension bar which is pivotally attached to the voting key intermediate its ends, its free end 21 extending rearwardly beyond the inner end of the voting key in line therewith, and adapted to oscillate on its pivot 14 in a plane with the direction of the key. The extension bar 3 has a lateral projection 17 near its longitudinal center and a notch or catch 22 in its upper edge near its free end to engage a register bar as hereafter stated. 2 is a dog which is pivotally mounted above each voting key with its free end normally resting upon said projection 17 to be actuated thereby, and has a catch 10 to engage the notch 8 of the voting key into which it falls when said key is pushed in to advanced position as shown (Fig. 2).

A series of benches 19 is solidly secured against the rear wall D in line with the several candidate rows of voting keys. These form supports for the inner ends of the several voting keys respectively which are slidable thereon through transverse guideways 80 as shown in Fig. 4. For single candidate rows I make a longitudinal guideway in the top of the bench to receive a slide-bar 20, which is adapted to slide longitudinally therealong immediately in advance of the inner ends of the several voting keys of the row alined therewith when said keys are at initial positions. The object of this arrangement is to prevent an elector from voting for more than one candidate of the row. To actuate this slidebar 20 I cut a series of notches 74 obliquely across said bar adjacent the inner ends of the voting keys respectively to intersect therewith, and crook said ends to register with said oblique notches respectively when any one of said voting keys is pushed to advanced position as shown in Fig. 4. The effect of this movement is such as to block the advance movement of all the other voting keys alined therewith until such advanced key, and thereby said slide-bar, is returned to initial position, as shown, 75 Fig. 4.

75$^a$ shows the crooked end of a voting key in advanced position. To prevent the pushing in of two or more alined keys simultaneously, the oblique direction of the several notches and the corresponding crooked ends of related voting stops are varied in their degree of slant respectively as shown in Fig. 4.

To actuate the free ends of the extension bars 3 and thereby the units wheels of their several companion counters as hereafter explained, I mount a series of slide-bars 24 (called register bars for convenience) and adapt the same to slide longitudinally and simultaneously along guideways in the rear wall D, each bar of the series being alined with a column of voting keys and movable directly across the several paths of the free ends of said extension bars 3 and in loose engagement therewith; said free ends moving endwise through slots or perforations 23, as shown in Figs 2 and 11. Said register bars are solidly connected at their lower ends respectively by a cross bar or yoke 92 (Fig. 11), and their longitudinal and simultaneous movement is accomplished by means of a cam lever 29 operating in said yoke upon a pivot supported by the rear wall or casing D. Additional uses of said lever will be noted hereafter.

My means of registering a vote and at the same time restoring the actuated parts to their respective initial positions are as follows;—A plurality of counters 23—one for each voting key—are mounted in a suitable frame 59 extending across and secured to the rear wall E, each in line with a row of voting keys, and in such a manner that the units-wheel of each will be out of direct range with its companion voting key but within reach of its companion extension bar when in advanced position, (as shown 21$^a$ Fig. 2), and actuated by a related register bar 24. The several register bars being always in operative engagement with the free ends of the several alined extension bars throughout the machine, when any one or more of the voting keys are pushed in to advanced position and there locked by the dog 2, as aforesaid, and said yoke 92 is actuated vertically, said register bars will carry all said advanced free ends simultaneously into operative engagement with their several companion units-wheels, actuating the same to the position shown at 21$^b$ (Fig. 2). The effect of this operation is two fold; the related units wheels, being rotated by the action of said advanced free ends respectively, severally record one vote as cast, and simultaneously therewith lift the dogs 2 out of engagement with the several notches 8 of all the advanced voting keys, thereby releasing the same to return simultaneously to their respective initial positions by the action of the springs 11. When a vote is thus registered and the advanced voting keys and actuated parts are restored to their several initial positions as aforesaid, the return of the hand lever P to its normal position at $s$ (Fig. 11) prepares the machine for another operation.

To provide means for simultaneously blocking the movement of one or more rows or all of the voting keys, I construct the catch 22 near the inner end of each extension bar 21 immediately opposite its point of engagement with the corresponding register bar when said extension bar is at its initial position, in such a manner that when said register bar is actuated downwardly said catch engages the slot or perforation 23, thereby locking said extension bar and said voting key from any advance movement. The means aforesaid for locking the voting keys at their initial positions are also available for restricting partially disqualified electors from voting for candidates or questions on which they are not entitled to vote. To accomplish this object I provide a supplementary series of register bars 25 (Fig. 11) controlled by a supplementary yoke 91 which solidly connects them in the same manner as those already described, and a supplementary cam-lever 30 to actuate the same by a hand lever 26. Each of said cam levers are actuated through a quarter circle, and their movements are limited and graduated by suitable catches $s$, as hereafter set forth. It is necessary that the main lever 27 should control the supplementary series of register bars while permitting their independent action to a limited extent. To accomplish this double object, I mount the supplementary yoke 91 and its cam lever 30 upon the upper part of the main yoke 92 and provide graduated catches $s^3$ $s^4$ and $s^5$ to limit the movement of said lever. The movement of the main lever is also limited and graduated by the catches $s$ $s'$ and $s^2$. (Fig. 11). The operation of the two levers is as follows; When said supplementary lever 26 is moved down to its limits at catch $s^3$, the corresponding yoke 91 is thereby drawn down upon the yoke 92; and, while in that position, if the main lever P be moved down to its limits at $s^2$, all the extension bars and thereby all the voting keys will be simultaneously locked against advance movement by means heretofore stated. Now, while said lever P is in this position, if the lever 26 be partially raised to the catch $s^4$, the supplementary yoke 91 will be thereby lifted from the yoke 92 sufficient to unlock all the extension bars of the supplementary series; and this is their normal position during an election. When the main lever P is raised to rest upon the catch $s$, all the voting keys of the machine are simultaneously unlocked. When the main lever is down upon the catch $s^2$ and the supplementary lever is at $s^4$, only the supplementary series is unlocked. By graduating the depth of the catches 22 in the several extension bars relating to one or more rows of voting keys of the supplementary series, said rows may be locked or unlocked respectively at intermediate positions of the supplementary lever. Movement of the main lever to its limits at $s'$ elevates both the yokes sufficient to release all advanced voting keys of both series, thereby accomplishing the registration of the entire vote as designated by the voter as aforesaid. Means are thus provided for instantaneously limiting voters upon either questions or candidates as may be required. By graduating the depth of the catches 22 in bars 25 to the top or end of the machine, it is apparent the rows of voting keys for question voting and non-partisan candidates or other subjects of limitation may be located either at the bottom or top or either end of the ballot sheet as may be preferred. The said operating levers are under the control of the election officer in charge, and the registration of a vote is thus accomplished by him when the voter retires from the booth. By extending the main lever shaft 27 entirely through the machine and fitting a similar hand lever upon it in front under the ballot sheet, means may also be provided whereby the voter, instead of the election officer, may register his own vote.

To afford means for operating the registering mechanism at a short distance from the machine if desired, I provide a rotatable shaft M mounted upon a support K and detachably connected to the shank of the lever shaft 27, and attach a hand lever L at its outer end to be actuated by the proper election officer in the manner aforesaid.

To keep a public tally of the total number of votes cast, I mount a counter 61 adjacent one of the register bars, with its units-wheel within reach of a spring actuated pawl 65 actuated by the movement of said register bar as shown in Fig. 11. to operate said units-wheel simultaneously with the registry of the vote as cast. To publicly announce the operation of said total vote counter, and the registration of the vote cast, I provide a gong 64 adapted to sound simultaneously with the actuation of said register bars and said counter, as shown in Fig. 11—the hammer of said gong being actuated by the movement of said register bars as aforesaid. The registry of each vote as cast is also indicated by the exposed dial of said counter, and fraudulent manipulation of the registration appliances is instantly exposed thereby.

To enable an elector to vote a straight party ticket, I use substantially the same voting mechanism and registering means already described, and in addition thereto provide means for simultaneously locking all voting keys except those of the supplementary series. To accomplish this, I mount a straight ticket voting key, similar to the others at the head of each party column and operatively connect the same with a straight ticket slide-bar 6 by a bell crank 7 as shown in Fig. 2, said slide-bar mounted against the rear wall D and adapted to slide at right angles with and so as to intersect the several single candidate slide bars 20 in notches 53 which register therewith, and behind the rock-bars 37, as shown in Fig. 2. The arrangement is such, that when the straight ticket bar 6 is actuated longitudinally by pushing in the corresponding straight ticket voting key to its limits, the several candidate bars 20 and 37 will be simultaneously locked thereby, and, when either of said candidate bars is actuated, said straight ticket slide bar 6 will in turn be locked so as to prevent the operation of all the straight ticket voting keys. By these means a mixed ticket being voted prevents the voting of a straight ticket and vice versa.

To prevent the operation of more than one straight ticket voting key I provide means for locking all the other straight ticket slide bars by the actuation of one of them as follows; A bench 82 (Figs. 2 and 6) is secured against the rear wall D near the top and provided with transverse channels 80 to receive and guide the upper ends of the several straight ticket bars 6. Said bench is further provided with a longitudinal guide-way in which a coupling slide-bar 18 is mounted and provided with a series of oblique notches 74 and adapted to slide in front of the adjacent upper ends of the several straight ticket bars aforesaid which are crooked to register therewith in the manner heretofore described. To prevent the operation of two or more of these straight ticket bars simultaneously, the several oblique notches and the corresponding crooked ends are progressively varied in their slant as shown in Fig. 6. The operation of this construction is such that when any one of the several straight ticket voting keys is pushed in to locked position, as shown in $75^a$ Fig 11, the coupling slide-bar 18 is moved laterally by the co-action of the corresponding crooked end and oblique notch aforesaid, thereby blocking the advance of any of the others. When said advanced straight ticket bar is returned to its initial position, said coupling slide-bar is also thereby returned to its initial position ready for another operation. When any one of said straight ticket bars 6 is advanced by pushing in a connected straight ticket voting key to a locked position, the several candidate bars 20 and 37 are thereby simultaneously locked by the intersecting notches and contact therewith, and its return to initial position restores them simultaneously to their respective positions so as to be ready for another operation. The foregoing means may also be utilized for cumulative voting by limiting the same to any plurality of benches included in a cumulative group. By the means aforesaid it is apparent the voter may actuate the several voting keys of a column either simultaneously or independently as he may prefer, but not both.

To provide for voting upon questions, I use substantially the same voting and registering mechanism already described, excepting that I arrange the several voting keys in pairs in connection with a slide-bar limited thereto, and arrange as many pairs upon one bench and with a common guide-way therein as the width of the machine will accommodate. Each pair of such voting keys is provided with crooked ends 75 and adapted to register with a similar pair of oblique notches in the slide-bar and to co-act therewith in the manner heretofore described and shown in Fig. 4 so that when either of a pair of voting keys is pushed in to locked position as shown at 75ª the other member of the pair is blocked by the changed position of the slidebar.

To prevent restricted voters from voting upon any one or more of several questions at an election, I arrange a hand-rod 71 (Fig. 4) in connection with the proper slide-bars 20 and extend the same outwardly for manipulation by the election officer. By drawing any of said rods a short distance the slide-bar connected thereto blocks the advance movement of both voting keys of the pair which co-act therewith until said slide-bar is returned to its initial position. Means for locking said hand-rod in advanced position may be provided if desired by forming a catch thereon in any well known way.

To provide for group voting—that is, to vote for several candidates for the same office out of a larger number, I use voting and registering mechanism in all respects similar to that already described. In addition thereto, in connection with benches 19 I construct a longitudinal guideway R, and mount therein a series of slide-bars 31 (Fig. 9) end to end with intervening spaces o between the same, and adapted to freely slide therein longitudinally in either direction. The extent of the space room throughout the series is adjusted and limited by a set screw 81 at one end of the line, and a set screw may be applied to any one or all of the slide-bars of the series to secure them in position and limit the amount of space between any two or more of the same. The spaces o are arranged in line with the row of voting keys intended to be included in the group, and suited to the number of voting keys of the row intended to be actuated. Each voting key is in operative engagement with a bell-crank 13, (Figs. 9 and 10), pivotally supported upon the bench, and a rod, having its free end 32 thickened, is hinged to the arm of said bell-crank. The rods which pertain to each row of voting keys may be arranged on one or both sides of the row, and extend so as to rest normally in the adjacent spaces with their thickened ends just beyond the line of said slide-bars 31, and are adapted to be locked thereby when the entire space o is closed by the set screws aforesaid, and the intervention of a predetermined number of the thickened ends of said rods drawn into said space by the action of the said bell-cranks and the voting keys connected therewith. By means of the end set screw 81 sufficient space may be allowed in the guideway R for the whole number of rods appertaining thereto, and as much more space as may be required for the limited number of rods to be actuated in the entire group voting mechanism, and different groups or series of groups may be regulated in like manner by intermediate set screws. To facilitate the action of the rods when more than two are used in any of the spaces, slide-plates o' are placed between adjacent rods and in thickness suited to the amount of displacement required by the thickened ends aforesaid. If preferred the end set screw may be also connected with a slide-bar. By the set screws means are also afforded for readily adapting the amount of space room in the guideway R to any modification of groups that may be desired, and especially to such groups as are necessary in primary elections and for cumulative voting. It is apparent that when the number of rods to be actuated are sufficient to take up all the space allowed by the set screw for any group of voting keys the pushing in of any other keys of the group to advanced position is made impossible.

I am aware that it is not new to use intervening rods and wedges in spaces between abutments which are stationary with respect to each other, and such I do not claim. My invention in this respect is confined to the means set forth for adjusting the amount of space required throughout the guideway to accommodate the several candidate rows of voting keys and groups of rows so that the lateral shift required to accommodate voting for any group or groups of candidates may be accomplished by means of the series of alined slide-bars extending through said guideway from end to end, and thereby avoid the use of a laterally movable channel as heretofore employed. It further consists of the novel means for actuating said rods 32 both in and out through said spaces respectively solely by the action of said bell-cranks and voting keys as set forth, thereby simplifying the mechanism while adapting the same to greater utility. If desired, the location of said guideway R and the direction and length of the several rods leading thereto may be modified to suit any mere change of form.

To better adapt my group voting mechanism to my straight ticket voting mechanism I arrange a rock-bar 37 in the longitudinal channel of the several benches included therein, and hinge the same therein along its rear lower edge 14 so that its forward edge lies immediately in front of the inner ends of the several voting keys of each row as shown in Fig. 5; the rear upper edge 55 of said rock-bar extends rearwardly in close proximity to the inner edge of the several straight ticket slide-bars 6 which are so notched (53 Fig. 8) that, when at initial position, said projecting edge will freely enter the corresponding notch 53 in said bars when said rock-bar is lifted to advanced position at 37ᵃ; and when said rock-bar is down at its initial position, if a straight ticket bar 6 be actuated vertically by pushing a straight ticket voting key to advanced position, said rock-bar will be thereby locked down and thereby block all the alined voting keys from advance movement, and when said rock-bar is rocked upwardly by the pushing in of a voting key of the alined row to advanced position all the straight ticket voting keys will be thereby simultaneously locked from advance movement. The several rock bars may be coupled together by a bar 39 to accomplish their simultaneous operation as shown in Fig. 10, for a purpose hereafter stated. To facilitate the operation of said rock bar its front edge is beveled and the inner ends of the voting keys which co-act therewith are beveled to register therewith.

To enable an elector to change his vote at pleasure before leaving the booth I provide means for withdrawing any one or more of the pushed in voting keys without thereby releasing any other operated key, preferably as follows: A channel 9 is cut along the outer end of the voting key to a point near the heel of the dog 2. The outer end of the voting key terminates back of the front surface of the front wall B, and is shaped to receive the inner end of the push knob 4 which is perforated accordingly; said push knob is also provided with an orifice 5 (Fig. 2), longitudinally in line with said channel 9. A slidable trigger 15 is loosely mounted to slide endwise in said channel, and is secured therein by a nut 12 and a spring 11, the said nut serving as an abutment for said spring and also for said push knob. The inner end of said trigger extends normally to near the heel 16' of said dog, and is adapted to reach the same and project therefrom outwardly through the casing B when the voting key is pushed to advanced position as shown in Fig. 2. A key Q is adapted to extend its shank 41 into said orifice 5 to engage the outer end 44 of said trigger as shown, Fig. 3. Its operation is such that when the voting key is locked in advanced position as aforesaid, pressure upon said trigger actuates the same against the heel of said dog, thereby lifting it out of engagement with the notch 8 in said voting key, whereupon said key returns to its initial position by the recoil of the spring 11. If preferred the shank 44 of the trigger may be extended exterior of the push-knob outside of the casing, but for the purpose of detaching the push-knob the detachable key Q is required. The location of the units-wheel of the counter out of direct range with the line of the voting key as aforesaid prevents the engagement of the extension bar 3 therewith, and its actuation thereby when the voting key is thus withdrawn by the voter, and accordingly he may change his vote at pleasure and only those left by him in advanced position will be registered by the action of the register-bars as aforesaid.

To provide means for voting an irregular ballot; that is for persons whose names may be written or printed by an elector, I arrange a column of voting keys at one side of the machine face, in all respects similar in construction and operation to the other voting keys thereon and in line therewith, and further provide openings through the ballot sheet and casing B at one side of said irregular voting keys, and provide means for covering and uncovering said openings when the alined voting keys are actuated, and also for actuating a continuous web over a platen behind said openings intermittently as follows:—A bell-crank V having a long arm 49 and a short arm 48 is pivotally mounted upon the bench 19; said long arm extends outwardly in line with its corresponding voting key 1ᵃ (Fig. 16) to the casing B and is there pivotally attached to a lateral arm which is adapted to engage a sliding cover X which is fitted to slide back and forth in said casing in front of a web W upon a platen O. The short arm of said bell-crank engages and is actuated by the irregular voting key which is adapted to actuate the candidate slide-bar 20 in all respects like the other alined voting keys as aforesaid. When any one or more of the regular voting keys are pushed in to advanced position advance movement of the corresponding irregular voting key is blocked by the action of the slide-bar 20 as shown in Fig. 16, 75ᵃ, and vice versa. In connection with my group voting mechanism, like means are provided for blocking advance movement of the irregular voting key alined therewith by the pushing in of any member of such group and arranging the slide-bar to co-act with the adjacent end of a rock-bar as shown 20ᵇ, Fig. 13. In such case the adjacent end is adapted to overlap the end of the rock-bar 37 by a projection 56 when at initial position, and said rock-bar to block advance movement of the slide-bar when the rock-bar is lifted (37ᵃ) by the pushing in of an alined voting key as aforesaid. Moreover, by coupling the rock-bars of any group a single opening for writing an irregular ballot therefor is provided as shown at J, Fig. 18. Other means may be used for interlocking the regular and irregular voting mechanism in connection with my bell-crank V and irregular voting key.

Means for actuating intermittently a web W mounted upon spools S S' are afforded by the use of a swinging member Z shaped and endwise pivoted like a door and adapted to swing in the path of said web intermediate the said spools and a pinch-bar Y pivotally mounted and adapted to impinge against the free edge of said swinging member and thereby carry said web forward when said bar and said member are actuated by the advance movement of the cover X, as shown, 56 and 57, Fig. 16. The return of said cover is accomplished by the action of the bell-crank V when the connected irregular voting key is restored to its initial position as aforesaid. Other means for actuating the web may be used in connection with said bell-crank and said movable cover and the irregular voting key may actuate a counter if desired in the manner hereinbefore described.

I am aware that it is not new to use slidable voting keys in connection with registering mechanism, nor to use a continuous paper web in connection with a series of covered openings for irregular voting, and such I do not claim broadly, but

Having thus fully described my invention in connection with related features, what I claim as new and desire to secure by Letters Patent is:—

1. In a voting machine, the combination with a slidable voting key, and means for locking the same in advanced position, of an extension bar pivoted on said key, its free end extending rearwardly therefrom in line therewith, a counter set with its units-wheel out of direct range with said extension bar and within reach of its free end when in advanced position and pivotally actuated, means independent of said voting key for impelling said extension bar to rotate said units-wheel while said voting key is in advanced position and means for unlocking and for returning said voting key to initial position immediately upon the actuation of said counter, substantially as set forth.

2. In a voting machine, the combination with a slidable voting key, and a dog adapted to lock said key in advanced position, of an extension bar pivoted on said key under said dog and extending rearwardly along said key to a point beyond its inner end, a counter set within reach of the free end of said extension bar when in advanced position and pivotally actuated, means independent of said voting key for impelling said extension bar to actuate said counter while said key is in advanced position, and means for tripping said dog, and for returning said key to its initial position immediately after the actuation of said counter, substantially as set forth.

3. In a voting machine, the combination with a slidable voting key and a companion counter out of direct range therewith, and a dog mounted to lock said voting key in advanced position, of an extension bar pivoted to said key intermediate its ends carrying said dog and extending rearwardly to a position which engages and actuates said counter by its free end when swung upwardly in advanced position, and simultaneously trips said dog; a register bar adapted to slide across the path of the free end of said extension bar in loose engagement therewith to swing the same into engagement with said counter to actuate the same and trip said dog, and means including a spring for returning said voting key to its initial position, substantially as set forth.

4. In a voting machine, the combination with a slidable voting key and a companion counter out of direct range therewith, a dog mounted to lock said voting key in advanced position, an extension bar pivoted to said voting key intermediate its ends and engaging said dog, of a register bar adapted to slide across the path of the free end of said extension bar in loose engagement therewith, a lever fulcrumed at one end of said register bar to actuate the same longitudinally, and means including a spring for returning said key and actuated parts to their respective initial positions simultaneously, substantially as set forth.

5. In a voting machine, the combination with a case, of a plurality of voting keys arranged in parallel rows, an extension bar pivoted to each of said voting keys intermediate its ends, its free end extending rearwardly therefrom, a dog depending on a seat upon each of said extension bars intermediate its ends adapted to hold said key in advanced position, a companion counter for each of said voting keys having its units-wheel set out of direct range therewith and within reach of the free end of said extension bar when in advanced position and swung upwardly, a series of register bars connected by a yoke and adapted to slide across the paths of the free ends of said several extension bars in loose engagement therewith, a lever fulcrumed to actuate said yoke, and means for returning said advanced voting keys to their several initial positions simultaneously, substantially as set forth.

6. In a voting machine, the combination with a case, a plurality of voting keys arranged in vertical and horizontal rows, dogs mounted to hold said keys when in advanced position respectively, an extension bar pivoted to each of said voting keys intermediate its ends, their free ends extending rearwardly beyond the inner ends of said keys respectively, a seat on each of said extension bars to support said dogs, counters set with their respective units-wheels out of direct range with their several companion voting keys, a series of register bars adapted to slide across the paths of the free ends of said extension bars respectively in loose engagement therewith, of a yoke solidly uniting the ends of said several register bars, a lever fulcrumed to actuate said yoke in the direction of said register bars, and means comprising springs for returning all advanced voting keys to their respective initial positions simultaneously, substantially as set forth, and for the purpose specified.

7. In a voting machine, the combination with a row of voting keys, of a bench alined therewith adapted to slidably support the inner ends of said voting keys, and having a longitudinal guideway, a slide bar mounted to slide back and forth in said guideway immediately in front of the said inner ends, means comprising said inner ends for actuating said slide bar in both directions, means for locking either of said voting keys when in advanced position, a row of companion counters, means for actuating either of said counters when its companion voting key is in advanced position, and means for unlocking and returning each advanced voting key immediately after the actuation of said counter, substantially as set forth.

8. In a voting machine, the combination with a row of voting keys, a bench alined with said row having a longitudinal guideway, of a slide bar mounted therein immediately in front of the inner ends of the several voting keys of the row, and adapted to slide therealong to a position which blocks the others of the row when either thereof is advanced to locked position, means for actuating said slide bar in both directions by its engagement with the inner end of a voting key when actuated in a corresponding direction, means for locking an advanced voting key, a row of companion counters for said voting keys, means for actuating either of said counters while its corresponding voting key is in advanced position, and means for unlocking and returning said advanced voting key immediately upon the actuation of said counter, substantially as set forth.

9. In a voting machine, the combination with a row of voting keys, of a slide bar having a series of oblique notches and mounted immediately in front of the inner ends of the several voting keys of the row, said ends being crooked and adapted to register with said oblique notches respectively, said slide bars adapted to slide therealong to a position which blocks the other voting keys of the row when either of them is advanced to a locked position, a dog adapted to lock said key in advanced position, an extension bar pivoted to said key intermediate its ends and extending rearwardly therefrom, a counter set out of direct range with the voting key and within reach of the free end of said extension bar when in advanced position and swung upwardly, means for swinging said extension bar when in advanced position to actuate said counter and trip said dog simultaneously, and means including a spring for returning said advanced key to its initial position, substantially as set forth.

10. In a voting machine, the combination with a row of voting keys, of a slide bar having a series of oblique notches and mounted immediately in front of the inner ends of the several voting keys of the row, said ends being crooked and adapted to register with said oblique notches respectively, said slide bar adapted to slide therealong to a position which blocks the other voting keys of the row when either thereof is advanced to a locked position, a dog to lock each stop when in advanced position, an extension bar pivoted to said stop intermediate its ends and extending rearwardly therefrom, a counter set out of direct range with said voting key and within reach of the free end of said extension bar when in advanced position and swung upwardly, a register bar mounted to slide across the path of the free end of said extension bar in loose engagement therewith to actuate said counter and trip said dog simultaneously, and means for returning said advanced key and extension bar to their respective initial positions simultaneously, substantially as set forth.

11. In a voting machine, the combination with a plurality of parallel rows of voting keys, a plurality of benches alined therewith having guideways therein, slide bars mounted in said guideways immediately in front of the inner ends of the several voting keys of each row, each slide bar adapted to slide to a position which blocks the others of its alined row from advance movement when either of the row is advanced to a locked position, said several slide bars having oblique notches at intervals, and said several voting keys having crooked ends adapted to register with said oblique notches respectively, of a plurality of dogs, one for each voting key, to lock the same in advanced position, companion counters, one for each voting key, set out of direct range therewith, an extension bar pivoted to each of said voting keys and extending rearwardly therefrom in operative engagement with said dog and adapted to engage said counter by its free end when swung upwardly in advanced position, a series of register bars yoked together and adapted to slide across the paths of the free ends of said several extension bars in loose engagement therewith respectively, and means for returning all advanced voting keys and bars to their respective initial positions, substantially as set forth and for the purpose specified.

12. In a voting machine, the combination with a plurality of voting keys arranged in a party column, companion counters and counter actuating mechanism therefor, of a straight ticket voting key for said column, a counter and counter actuating mechanism therefor, of a slide bar operable at right angles with the direction of said straight ticket voting key, a bell crank in operative engagement with both said members, a plurality of slide bars operable at right angles with said straight ticket slide bar, and adapted to intersect the same by co-acting notches and mutually interlock, and means for unlocking and returning advanced voting keys when any of said counters is actuated, substantially as set forth.

13. In a voting machine, the combination with a plurality of parallel rows of voting keys arranged in several party columns, companion counters and counter actuating mechanism therefor, of a plurality of straight ticket voting keys, one for each column, a plurality of slide bars, one for each row, in operative engagement with the inner ends of the several voting keys thereof, a series of notches at intervals in each of said slide bars, of a series of transverse slide bars, one in operative engagement with each of said straight ticket voting keys, and mounted and adapted to slide across the respective paths of said row slide bars in said notches, and co-act therewith, and means for unlocking and returning advanced keys to their respective initial positions when any of the several counters is actuated, substantially as set forth and for the purpose specified.

14. In a voting machine, the combination with a plurality of parallel office rows of voting keys arranged in several party columns, companion counters and counter actuating mechanism, of a straight ticket voting key for each column and a companion counter, a bar mounted immediately in front of the inner ends of each office row adapted to block its voting keys from advance movement, a slide-bar in operative engagement with said straight ticket voting key at right angles therewith and with said office row bars, and adapted to intersect the same when said straight ticket voting key is advanced to a locked position and said candidate voting keys are at their several initial positions, and means for returning said straight ticket voting key to its initial position, substantially as set forth and for the purpose specified.

15. In a voting machine, the combination with a plurality of parallel office rows of voting keys arranged in several party columns, companion counters and counter actuating mechanism, of a straight ticket voting key for each column and a companion counter, a bar mounted immediately in front of the inner ends of each office row of voting keys and adapted to block the same from advance movement, a slide bar in operative engagement with said straight ticket voting key at right angles therewith and with said office row bars, and adapted to intersect the same in such a manner that when said slide-bar is at its initial position it may be locked by the movement of either of said office row bars, and, vice versa, when said straight ticket voting key is advanced to a locked position it may lock all the office rows of voting keys in their respective initial positions, by means of said intersection; and means for returning all advanced keys to their several initial positions simultaneously, substantially as set forth.

16. In a voting machine, the combination with a plurality of parallel office rows of voting keys arranged in party columns, of a plurality of straight ticket voting keys; a plurality of candidate bars, one alined with each office row; a plurality of transverse slide bars, one in operative connection with each straight ticket voting key, and adapted to slidably intersect said office row bars at right angles with notches at their intersection respectively and mutually interlock each other; counters and counter actuating mechanism, means for actuating said counters only when their companion voting keys are in advanced position respectively, and means for returning all advanced voting keys to their several initial positions simultaneously, substantially as set forth.

17. In a voting machine, the combination with a plurality of office rows of voting keys arranged in several party columns, of a plurality of straight ticket voting keys, a plurality of candidate bars, one alined with each office row of voting keys; a plurality of transverse slide bars, one in operative connection with each straight ticket voting key, and adapted to slidably intersect said office row bars at right angles with notches at their intersection respectively and mutually interlock each other; a coupling slide bar provided with a series of oblique notches and adapted to slide in a guideway immediately in front of the adjacent ends of the several transverse slide bars which are severally in operative connection with the straight ticket voting keys related thereto, said adjacent ends being crooked and adapted to register with said oblique notches when said bars are actuated respectively by the advance of a straight ticket voting key, and thereby to block all other voting keys from advance movement; counters and counter actuating mechanism; means for actuating said counters only when their companion voting keys are in advanced position respectively, and means for returning all advanced voting keys to their respective initial positions simultaneously, substantially as set forth.

18. In a voting machine, the combination with a plurality of parallel office rows of voting keys arranged in several party columns, of a bench alined with each office row adapted to support the inner ends of the several voting keys thereof, a rock-bar mounted on said bench immediately in front of said inner ends and adapted to be rocked upwardly, when any key of the row is advanced, to a position which permits others of the row to be advanced likewise, a straight ticket voting key for each party column, a transverse slide bar in operative connection with said straight ticket voting key, and adapted to slidably intersect said rock bar at right angles, to block the same at its initial position when said straight ticket voting key is advanced to locked position; and said transverse bars adapted to be locked by said rock bar, when any of said voting keys is advanced to locked position, by said intersection; counters and counter actuating mechanism for the voting keys respectively, and means for returning all advanced voting keys to their respective initial positions simultaneously, substantially as set forth.

19. In a voting machine, the combination with a plurality of parallel office rows of voting keys arranged in several party columns, of a bench alined with each office row adapted to support the inner ends of the several voting keys thereof, a straight ticket voting key in each party column, a series of rock-bars, one for each office row, mounted on said benches respectively immediately in front of the said inner ends and adapted to be rocked, when any key of the row is advanced, to a position which permits others of the row to be advanced likewise, a series of transverse bars, one for each party column in operative engagement with the straight ticket voting key thereof and adapted to slidably intersect said rock bars at right angles, and said transverse bars having a series of notches adapted to register with the rear upper edge of the adjacent rock bar only when at their respective initial positions; means for limiting the number of voting keys that may be advanced in a group; counters and counter actuating mechanism, and means for returning all advanced voting keys simultaneously to their respective initial positions, substantially as set forth and for the purpose specified.

20. In a voting machine, the combination with a straight ticket voting key, of a group of voting keys arranged in several office rows and party columns, a rock bar alined with each row, and adapted to rock upwardly when one of the alined row of stops is advanced to locked position, a transverse slide bar in operative engagement with said straight ticket voting key and adapted to slide across the rear edges of the several rock bars at right angles, a series of notches in said transverse bar adapted to register with said rear edges only when at initial positions respectively, counters and counter actuating mechanism, means for limiting the number of keys to be advanced in the group, and means for returning advanced voting keys to their respective initial positions either simultaneously or independently, substantially as set forth and for the purpose specified.

21. In a voting machine, the combination with a group of voting keys arranged in one or more office rows and party columns, and a series of benches adapted to support successively the inner ends of the several voting keys of the group, of a stationary guideway alined with said group, a series of slide bars mounted end to end with limited spaces between them, and adapted to limited longitudinal movement therein in both directions freely, and each section of the series of slide bars adapted to be securely fastened in said guideway at pleasure, and the end sections adapted to be secured in longitudinal adjustment to limit the amount of space room throughout the entire guideway; a series of rods, one in operative engagement with each voting key of the group by a coacting bell-crank, arranged to rest normally in the adjacent space between two slide bars of the series in line with the row, said rods having thickened ends whereby they are locked in said guideway when a predetermined number of said thickened ends have filled the space allowed by said end sections and the alined series of slide bars; counters and counter actuating mechanism, and means for returning all advanced voting keys to their respective initial positions either independently or simultaneously, substantially as set forth.

22. In a voting machine, the combination with a plurality of parallel office rows of voting keys arranged in several party columns, a bench alined with each office row adapted to support the inner ends of the several voting keys thereof, of a stationary guideway alined with the series, a plurality of slide bars mounted end to end in said guideway with limited spaces between them, and adapted to slide endwise therein in both directions freely, and each section of the series adapted to be securely fastened in said guideway when required, and the end sections thereof adapted to be secured in longitudinal adjustment to limit the amount of space room required throughout the entire guideway; a series of rods, one in operative engagement with each voting key of the series by means of a bell-crank, adapted to rest normally in the adjacent space between two slide bars of the series in line with the row; a slidable plate between adjacent rods in the space between slide bars; said rods provided with thickened ends whereby they are locked in said guideway when a predetermined number of said thickened ends have filled the space allowed by said end sections and alined series of slide bars and plates; counters and counter actuating mechanism, and means for returning all advanced voting keys to their several initial positions either separately or simultaneously, substantially as set forth and for the purpose specified.

23. In a voting machine, the combination of a plurality of slidable voting keys arranged in several office rows and party columns, a bench alined with each office row, a companion counter for each voting key mounted behind said bench and set out of direct range with the voting key, means for locking said key when in advanced position, an extension bar pivoted to said key, a plurality of register bars united by a yoke, each register bar being in operative engagement with all the extension bars of the column and adapted to actuate the same against their respective counters simultaneously when such extension bars are in advanced position, means for actuating said yoke, a stationary guideway, a plurality of slide bars mounted and adapted to slide longitudinally therein or to be adjustably secured at pleasure with limited space between adjacent ends, means for adjustably securing the end sections of the guideway longitudinally to limit the amount of space throughout the same, a plurality of rods, one in operative engagement with each voting key of a row, adapted to rest normally in the related space between adjacent slide bars, said rods having thickened ends whereby they are locked in said guideway when a predetermined number of such thickened ends have filled the space allowed by said end sections and alined slide bars; and means for simultaneously unlocking all advanced voting keys and for returning the same to their respective initial positions, substantially as set forth and for the purpose specified.

24. In a voting machine, the combination with a plurality of voting keys arranged in several office rows and party columns, of a pair of voting keys, a bench for said pair alined with said rows, a counter for each of said pair mounted back of said bench out of direct range with said voting keys respectively, means for blocking one of said pair from advance movement when the other is advanced to locked position, an extension bar pivoted to each of said pair, and extending rearwardly to its companion counter, when in advanced position; a register bar in loose engagement with said extension bar at right angles therewith, means for actuating said register bar and thereby said extension bar and said counter, and means for returning the advanced key to its initial position, substantially as set forth.

25. In a voting machine, the combination with a plurality of voting keys arranged in several office rows and party columns, of a pair of voting keys, a bench alined with said rows to support said pair and having a guideway therein, a slide bar loosely mounted in said guideway immediately in front of the inner ends of said pair and adapted to slide therealong to a position which blocks one member of the pair from advance movement when the other of the pair is advanced to a locked position, a companion counter for each of said voting keys set out of direct range therewith, means for locking said advanced member, means for actuating either of said counters only when the related voting key is in advanced position, and means for returning such advanced key to its initial position simultaneously with the movement of said counter, substantially as set forth.

26. In a voting machine, the combination with a plurality of voting keys arranged in several office rows and party columns, of a plurality of pairs of voting keys mounted upon a common bench alined with said rows, a series of slide bars, one for each pair, loosely mounted in said guideway immediately in front of the inner ends of said pairs respectively and adapted to slide therealong, each to a position which blocks one member of its related pair from advance movement when the other of the pair is advanced to a locked position, a companion counter for each of said voting stops set out of direct range therewith, means for locking said advanced keys respectively, means for actuating either of the counters of any pair only when the voting key related thereto is in advanced position, and means for returning such advanced keys to their respective initial positions either simultaneously or independently of each other and simultaneously with the actuation of the said counters, substantially as set forth and for the purpose specified.

27. In a voting machine, the combination with a case, of a pair of question voting keys mounted on a bench alined therewith, a slide bar adapted to slide in a guideway immediately in front of the inner ends of said keys in said bench, said slide bar having oblique notches to register with crooked ends on said keys respectively, means for actuating said slide bar independently of said keys when at their initial positions, counters and counter actuating mechanism, and means for returning advanced voting keys to their respective initial position simultaneously with the actuation of the counter, substantially as set forth and for the purpose specified.

28. In a voting machine, the combination with a case, of a series of pairs of question voting keys mounted on a common bench alined therewith, a series of slide bars mounted end to end in a common guideway in said bench, each slide bar having a pair of oblique notches adapted to register with the crooked adjacent ends of said keys respectively, and adapted to slide immediately in front of said ends in both directions in said guideway, a hand rod in operative engagement with one or more of said slide bars extending outwardly, means for locking said hand rod, counters and counter actuating mechanism, and means for returning advanced voting keys to their respective initial positions either simultaneously or independently of each other, and simultaneously with the actuation of the respective counters, substantially as set forth and for the purpose specified.

29. In a voting machine, the combination with a voting key and a companion counter, of a dog adapted to engage said key when in advanced position, a channel in said key leading to said dog, a push-knob on said key having a perforation alined with said channel, a trigger mounted to slide freely in said channel in both directions, a key having a shank adapted to reach said trigger when the voting key is in advanced position and said trigger engages said dog, and means for movably securing said trigger in said channel, substantially as set forth and for the purpose specified.

30. In a voting machine, the combination with a slidable voting key, and a companion counter set out of direct range therewith, of a dog pivotally mounted and adapted to engage said key by a catch when in advanced position, a channel in said key leading to said dog, a push-knob on said key having a perforation alined with said channel, a trigger fitted to slide freely in said channel in both directions a limited distance, a key with shank adapted to reach said trigger when said voting key is in advanced position and said trigger engages said dog to disengage it from said catch, means for movably securing said trigger in said channel, and means independent of said trigger for returning advanced voting keys to their respective initial positions simultaneously with the actuation of the counters, substantially as set forth and for the purpose specified.

31. In a voting machine, the combination with a plurality of slidable voting keys arranged in several office rows and party columns, counters and counter actuating mechanism for said voting keys respectively, of an irregular voting key alined with an office row, having a crooked inner end adapted to register with an oblique channel of a slide bar alined with said office row, a bench to support said row, having a longitudinal guideway for said slide bar, a bell crank pivotally secured to said bench, having a short arm in operative engagement with said irregular voting key and a long arm in operative engagement with a rod back of the machine face, an opening in the machine face at one side of said irregular voting key, a stationary platen back of said opening, a slidable cover movable by said rod to uncover and cover said opening when said key is advanced and returned respectively, a pair of spools actuated in one direction by said rod and cover, a web on said spools extending across said platen, means for actuating said web in forward direction only, and means, including a spring, for returning said irregular voting key and said cover to their respective initial positions simultaneously with the return of other advanced voting keys, and with the actuation of the counters related thereto, substantially as set forth and for the purpose specified.

32. In a voting machine, the combination with a plurality of slidable voting keys, arranged in several office rows and party columns, counters and counter actuating mechanism for said keys respectively, a series of benches to support said rows, a rock bar mounted on each bench immediately in front of the inner ends of said voting keys alined therewith, means for pivotally connecting two or more of said rock bars, a slide bar movable in a guideway on a bench adapted to co-act with said rock bar, a bell crank pivotally secured to said bench and having a short arm in operative engagement with the adjacent irregular voting key and a long arm in operative engagement with a rod movable back of the machine face, a column of irregular voting keys, each key having a crooked inner end adapted to register with an oblique notch in a slide bar mounted on the adjacent bench and adapted to co-act with a rock bar thereon, a plurality of openings in the machine face, one opposite each irregular voting key, a stationary platen mounted back of said openings, a plurality of slidable covers severally operable by said bell cranks and rods respectively, a web on spools arranged to wind across said platen and adapted to be actuated in one direction only by means including said bell crank and rod, and means, including springs, for returning all advanced voting keys and covers simultaneously with the actuation of counters related thereto, substantially as set forth and for the purpose specified.

33. In a voting machine, the combination with a plurality of slidable voting keys arranged in several office rows and party columns, counters and counter actuating mechanism, a series of benches to support said rows, a rock bar mounted on each bench immediately in front of the inner ends of alined voting keys, means for pivotally connecting two or more of said rock bars, straight ticket voting mechanism in operative engagement with said rock bars, a column of irregular voting keys, means for interlocking said keys respectively with one or more of said rock bars, of a bell crank pivotally secured to a support and having arms of unequal length, the short arm in operative engagement with the alined voting key, and the long arm affording means for actuating a slidable cover to an opening in the face of the machine adjacent the voting key, and to actuate a web across a platen mounted behind said opening, substantially as set forth.

34. In a voting machine, the combination with a plurality of voting keys arranged in several office rows and party columns, counters and counter actuating mechanism, means for limiting the number of keys that may be actuated in any group or groups, a column of irregular voting keys, said keys arranged to aline with the several rows respectively, an opening in the machine face adjacent each irregular voting key, a slidable cover for said opening, and means for actuating said cover, comprising a bell-crank having unequal arms operable by said irregular voting key, substantially as set forth.

35. In a voting machine, the combination with a plurality of voting keys arranged in several office rows and party columns, counters and counter actuating mechanism, means for limiting the number of voting keys that may be actuated in any group or groups, a column of irregular voting keys, said keys alined with the several rows respectively, means for interlocking the several irregular voting keys with any related group in said office rows, an opening in the machine face adjacent each irregular voting key and a slidable cover for said opening, of means for actuating said cover, comprising a bell crank having arms of unequal length operable by said irregular voting key, substantially as set forth and for the purpose specified.

36. In a voting machine, the combination with a plurality of register bars operable by a yoke and lever, of a supplementary series of register bars attached to a yoke mounted upon said primary yoke and operable thereby, a supplementary lever fulcrumed on said primary yoke adapted to actuate said supplementary yoke independently to a limited position, means for limiting the movement of said supplementary yoke to that of the primary yoke, means for limiting the movement of said primary yoke, and means for actuating both of said yokes and thereby their attached register bars in the same direction either simultaneously or independently, or in opposite directions at pleasure, substantially as set forth and for the purpose specified.

37. In a voting machine, the combination with a plurality of voting keys arranged in several office rows and party columns, counters for the several voting keys having their units-wheels set out of direct range with their companion voting keys, an extension bar pivotally attached to each voting key, its free end extending rearwardly therefrom and having a catch thereon, a register bar for each column fitted to slide across the path of the free ends of said extension bars therein and in loose engagement therewith and with said catches respectively, said register bars comprising two series, the larger, a primary series and attached to a primary yoke, the smaller series, attached to a supplementary yoke, and each of said yokes operable by a separate lever, said supplementary yoke loosely mounted upon said primary yoke, and the lever thereof fulcrumed thereon, catches for limiting the movement of said levers respectively in both directions, and means for locking the same, substantially as set forth and for the purpose specified.

38. In a voting machine, the combination with a series of register bars a yoke and a lever, of a public counter having its dial exposed, a pawl in operative connection with one of said register bars, adapted to engage the units wheel of said counter only when in advanced position, a gong mounted in relation to said register bar, and a ratchet in operative engagement therewith adapted to sound said gong only when said register bar is in advanced position, and simultaneously with the actuation of said counter, substantially as set forth.

39. In a voting machine, the combination with a slidable voting key an expansion bar pivotally attached thereto and operable thereby, said extension bar having a catch at its free end, of a register bar mounted and adapted to slide at right angles across the path of said free end in loose engagement therewith in loose engagement in front of said catch and means for actuating said register bar longitudinally a limited distance in both directions, substantially as set forth and for the purpose specified.

40. In a voting machine, the combination with a plurality of voting keys, a plurality of extension bars pivoted thereto respectively, a catch near the free end of each extension bar, a plurality of register bars yoked together and mounted and adapted to slide across the paths of the said free ends respectively in front of said catches when said keys are at initial positions, means for actuating said yoke in the direction of said catches or away from the same at pleasure, means for limiting the action of said yoke in either direction, substantially as set forth and for the purpose specified.

41. In a voting machine, the combination of a voting key having a channel along its outer end, a nut on said key about said channel back of the front surface of said case, and a push knob detachably secured to said key against said nut, and having a perforation from end to end alined with said channel and the adjacent end of said key to register therewith, substantially as set forth and for the purpose specified.

42. In a voting machine, the combination of a case, a series of perforations therein, a ballot sheet having election indicia suited to an election and perforations registering with the perforations of said case required for said election, voting keys terminating back of the front surface of said case and adapted to register with the perforations therein, push knobs detachably secured to said key through said perforations and having an orifice alined with a channel in said keys respectively, means for locking said keys in advanced position, and means for unlocking said keys through said push knobs respectively, substantially as set forth and for the purpose specified.

43. In a voting machine, the combination of the casing, with a plurality of keys mounted to reciprocate therein, a corresponding plurality of vote tallying mechanisms controlled thereby, and locking and releasing mechanism coöperating with each key to hold it in its advanced position, comprising a latch mounted upon a stationary part of the machine and engaging said key, and an operative member engaging said latch and extending outwardly therefrom through the casing adjacent the key in both of its positions for releasing it without thereby releasing any other key that may be operated.

In witness whereof, I hereunto set my hand.

HIRAM B. SWARTZ.

In presence of—
BENTON G. HAY,
W. O. BEEBE.